United States Patent
Simon

(10) Patent No.: US 12,535,992 B2
(45) Date of Patent: Jan. 27, 2026

(54) RANDOM NUMBER GENERATION BASED UPON A RANDOM BIT SOURCING FROM ONE OR MORE REGISTERS OF A COMPUTER

(71) Applicant: KAPSLOG, Maisons-Laffitte (FR)

(72) Inventor: Peter Roger Simon, Maisons-Laffitte (FR)

(73) Assignee: KAPSLOG, Maisons-Laffitte (FR)

( * ) Notice: Subject to any disclaimer, the term of this patent is extended or adjusted under 35 U.S.C. 154(b) by 421 days.

(21) Appl. No.: 18/016,335

(22) PCT Filed: Apr. 13, 2022

(86) PCT No.: PCT/EP2022/059906
§ 371 (c)(1),
(2) Date: Jan. 14, 2023

(87) PCT Pub. No.: WO2022/248117
PCT Pub. Date: Dec. 1, 2022

(65) Prior Publication Data
US 2023/0305809 A1    Sep. 28, 2023

(30) Foreign Application Priority Data
May 28, 2021 (FR) ..................... 2105603

(51) Int. Cl.
*G06F 7/58* (2006.01)
(52) U.S. Cl.
CPC ............... *G06F 7/588* (2013.01); *G06F 7/58* (2013.01); *G06F 7/582* (2013.01)
(58) Field of Classification Search
CPC ............ G06F 7/58; G06F 7/582; G06F 7/583
See application file for complete search history.

(56) References Cited

U.S. PATENT DOCUMENTS

| | | | |
|---|---|---|---|
| 5,983,252 A * | 11/1999 | Clapp ................... | H04L 9/0668 708/250 |
| 2010/0192014 A1 | 7/2010 | Mejdrich et al. | |
| 2015/0055778 A1 | 2/2015 | Cox et al. | |

OTHER PUBLICATIONS

Martin et al., Randomness Assesment of an Unpredictable Random No. Generator based on Hardware Performance Counters, Rom. J. Inf. Sci. & Tech., v.20 n.2 at 136-160 (2017).

* cited by examiner

*Primary Examiner* — Michael D. Yaary
(74) *Attorney, Agent, or Firm* — CRGO Global; Steven M. Greenberg

(57) ABSTRACT

This method is implemented within a digital processor by: a) searching an internal register (R1, R2, R3, . . . R(n)) of the processor which content (b0, b1, b2, . . . b(n)) changes over time; b) extracting at a given time n bits from the register, n≥1; c) using the n bits extracted at step b) as bit(s) for forming a random number of N bits to be generated; d) reiterating (250) steps a) to c) until obtaining the N bits of the random number; and e) providing the random number to an application circuit or software. In order to increase randomness, the method further comprises a selection (240), by a random of pseudo-random process, of the n bits of the register which will be extracted, and/or a selection (230), by a random of pseudo-random process, of one register among a plurality of internal registers (R1, R2, R3, . . . R(n)) of the processor that may be potentially searched and selection of the n bits from the selected register, in particular a selection, by a random of pseudo-random process, of at least one of the bits of the selected register.

8 Claims, 3 Drawing Sheets

RANDOM NUMBER GENERATION BASED UPON A RANDOM BIT SOURCING FROM ONE OR MORE REGISTERS OF A COMPUTER

CROSS-REFERENCE TO RELATED APPLICATIONS

This application is a § 371 national phase entry of International Application No. PCT/EP2022/059906, filed Apr. 13, 2022, which claims priority to French Patent Application No. 2105603 filed on May 28, 2021, the entirety of which is incorporated herein by reference.

TECHNICAL FIELD OF THE INVENTION

The invention relates to random number generation.

Many techniques require random numbers, especially in the field of cryptography when it comes to implementing high-security encryption algorithms such as AES, RSA, Diffie-Hellman, etc. But random number draws are used in many other domains, such as games of chance, or also probabilistic modeling techniques or sample selection for statistical purposes.

STATE OF THE ART

There are multiple ways to generate random numbers, with variable levels of entropy, entropy being defined as the measure of the effective degree of randomness (lack of deterministic nature and predictability in the draw) of the generated value.

In some cases, it may be sufficient to generate "pseudo-random" numbers, i.e. numbers that are obtained by a method that is deterministic but that produces values sufficiently independent of each other to satisfy the needs of the considered applications: for example, modeling algorithms using probabilistic techniques, or statistical purpose sampling methods.

On the other hand, particularly in the case of data encryption, it is essential that no detectable link exists between successive numbers in the series of random numbers provided by the generator, that is to say that the numbers produced are absolutely impossible to predict.

The methods for generating random (and not simply pseudo-random) numbers that have been used up to now are mainly based on physical, material phenomena (for example a thermal or electromagnetic noise) or on an unpredictable interaction with a user, for example the erratic movements of a mouse, which are neither cyclic nor deterministic.

These generators provide very-high-entropy random numbers but have for drawback to be relatively complex, because they require hardware circuitry for collecting the physical phenomenon or the interaction with the user, analog-to-digital converter circuits, an algorithmic module for generating the random digital value, etc.

Moreover, they are poorly suited to the generation of very large random numbers (several tens or hundreds of bits), except at the cost of an excessively long response time between the request for obtaining the random number and the effective delivery of the result by the generator.

The article of Marton K et al., "Randomness Assessment of an Unpredictable Random Number Generator based on hardware Performance Counters", *Romanian Journal of Information Science and Technology*, Vol. 20, No. 2, 2017, 136-160, proposes a (pseudo-) random number generation technique consisting in sampling the content of one (or several) of the hardware performance counter(s) of a processor and in using the sampling result as a source of unpredictable random value.

The hardware performance counters are dedicated registers present in recent microprocessors, used for performance monitoring of the processor in operation. These counters count events (in the computer sense of the term) in relation with the activity of the processor: successful or missed cache accesses, instruction pipeline progress, etc. or also durations for which a given condition remains 'true', by counting the number of CPU cycles elapsed until this condition changes.

The highly unpredictable nature of evolution of these counters, linked to multiple and very changing states of the processor operation, induces a high entropy allowing the generation of random number sequences. In other words, the random nature of the register content is attributed to the system entropy and to the multitude of processes and threads executed simultaneously.

However, this technique is not immune to phenomena such as: cyclic evolutions of the processor states, repetitive operating sequences, iterations, etc. To address this risk, the above-mentioned article of Marton et al. describes how to operate a "calibration" of the random number generator by "randomness assessment" of the sequences produced for various settings of the generator, making it possible to select the configurations that provide the best entropy.

Consequently, implementation of this technique requires a calibration of the generator to reduce the effect of all the potential operating biases, and to ensure that the (pseudo-) random number generation will be made with the desired level of entropy.

Now, the most recent high-security encryption applications require very fast generation of long and high-entropy random numbers, that may be guaranteed in an unconditional manner, with no preliminary analysis nor setting of operating parameters of the generator.

The aim of the invention is to remedy these difficulties and limitations, by proposing a random number generation technique offering, simultaneously:
  a very great simplicity of implementation, without the use of any hardware circuitry;
  the possibility of providing at a very high rate random numbers as long as desired;
  a maximal entropy of the numbers generated, better than what has been proposed so far with techniques such as the ones of Marton et al.;
  the immediate guarantee of an optimum operation with a maximum entropy, with no use of a previous calibration; and
  the possibility, in certain implementations, of making the proper operation of the random generator dependent on a higher-level parameter, itself randomly changed at each iteration of the process, that is to say with a double degree of randomness for each number obtained.

DISCLOSURE OF THE INVENTION

These aims are achieved, according to the invention, by a random number generation method implemented by means of a digital processor, comprising: a) searching an internal register of the processor, wherein the content of the register is an evolutive content which changes over time; b) extracting at a given time n bits from the register, n≥1; c) using the n bits extracted at step b) as bit(s) for forming a random number of N bits to be generated; d) reiterating steps a) to c) until obtaining the N bits of the random number; and e) providing the random number to an application circuit or software.

Characteristic of the invention, the method further comprises, before step b), a step of selecting, by a random of pseudo-random process, the n bits of the register which will be extracted at step b), and/or of selecting, by a random of pseudo-random process, one register among a plurality of internal registers of the processor that may be potentially searched and selecting the n bits from the selected register, in particular selecting, by a random of pseudo-random process, at least one of the bits of the selected register.

According to various advantageous subsidiary embodiments:
at least one internal register of the processor comprises an internal timestamp register which counts pulses of a clock for sequencing the processor, in particular a register which counts pulses directly outputted from an oscillator;
at least one internal register of the processor comprises a register which counts processor events;
steps a) to e) are carried out within a firmware of the processor;
the n bits extracted at step b) are the least significant bit(s) of the register;
the given time of extraction of the n bits at step b) is a time which is determined by a random or pseudo-random process; and/or
the given time of extraction of the n bits at step b) is a time determined in response to a request received from the application circuit or software.

BRIEF DESCRIPTION OF THE DRAWINGS

Exemplary embodiments of the present invention will now be described with reference to the appended drawings in which the same references denote, throughout the figures, identical or functionally similar elements.

DETAILED DESCRIPTION OF THE INVENTION

Figure 1:
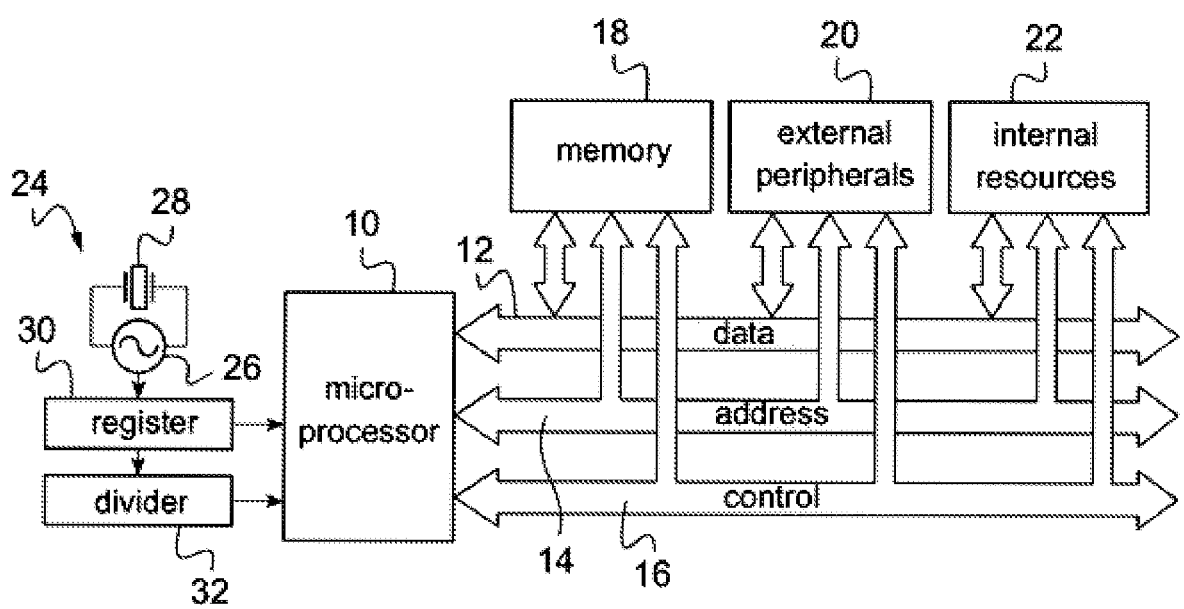
FIG. 1 schematically illustrates a digital processor with the various blocks to which it is interfaced, the whole being used for implementing the method of the invention.

FIG. 1 schematically shows a per se conventional architecture of a system with a digital processor.

A microprocessor or microcalculator 10 is interfaced by data bus 12, address bus 14, and control bus 16 respectively to memory circuits 18, external peripherals 20, and internal resources 22.

The general sequencing of the processor 10 is provided by a clock circuit 24 comprising an oscillator 26 driven by a crystal 28. The ticks of the oscillator 26 feed a timestamp register 30 counting the pulses that will be used to define the rate of the successive CPU cycles of the processor 10 after reduction of the frequency by a divider 32. The content of the timestamp register 30 is an evolutive content, constantly changing with the rhythm of the sequencing clock 24 pulses.

Figure 2:
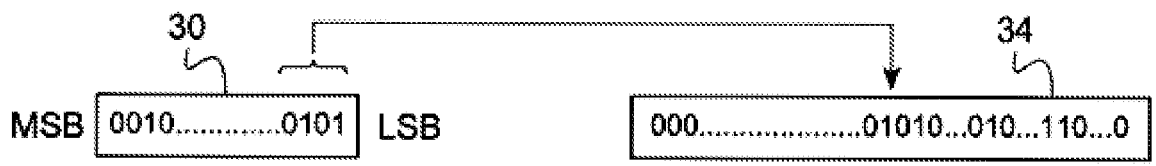
FIG. 2 explains how to generate a random number by searching a register of the system of FIG. 1.

The principle of the invention, schematized in FIG. 2, consists in reading one or several bits (n bits, with $n \geq 1$) of a register of the processor which changes with a fast rhythm, in particular (but not in a limitative manner) the timestamp register 30, and using these n bits to form the N bits of a random number 34 of N bits ($N \geq n$).

If n<N, the process is reiterated until completion the N bits of the number 34.

It is possible to extract, indifferently, for example one bit (n=1), a nibble (n=4), a byte (n=8), etc., at a time to obtain the N bits of the random number 34, without specific limitation on the number N, and hence on the length of the random number obtained.

In most microprocessors, the timestamp register is an accessible and searchable register. For example, in Intel™ processors, this timestamp register is a 64-bit register called TSC (TimeStamp Counter), and it can be searched by a low-level instruction RDTCP (Read TSC and Processor ID).

This counter can reflect the number of pulses produced by the sequencing clock since the initial reset of the register.

Advantageously, the extracted bit(s) are the least significant bits (LSBs) of the register, which are bits whose value is totally unpredictable at a given time, given the very high clock frequencies of current processors, typically several gigahertz, that is to say that the last bits of the timestamp register are changed several times at each nanosecond.

Further, the time of execution of the register search instruction is itself subject to an unpredictable randomness, which increases the randomness on the value of the bit(s) read when this search is effectively carried out. Indeed, the hardware-level architecture of the microcalculators induces irregularities in the sequencing of execution of the microinstructions due to hardware interrupts (external events that trigger the execution of specific software programs and interrupt the execution of other software programs in an imperative way), but also due to the necessary coordination of several cores that execute tasks in parallel.

In addition, above the hardware layer are added several software layers that run themselves with different priority levels and in constant competition with external events and other software programs running at the same time.

It is hence impossible to predict when a particular microinstruction of an application software will actually be executed, and consequently, to determine in advance the value of the timestamp register bits at that time, especially that of the least significant bits, at the time when the register reading instruction will be actually executed.

Figure 3:
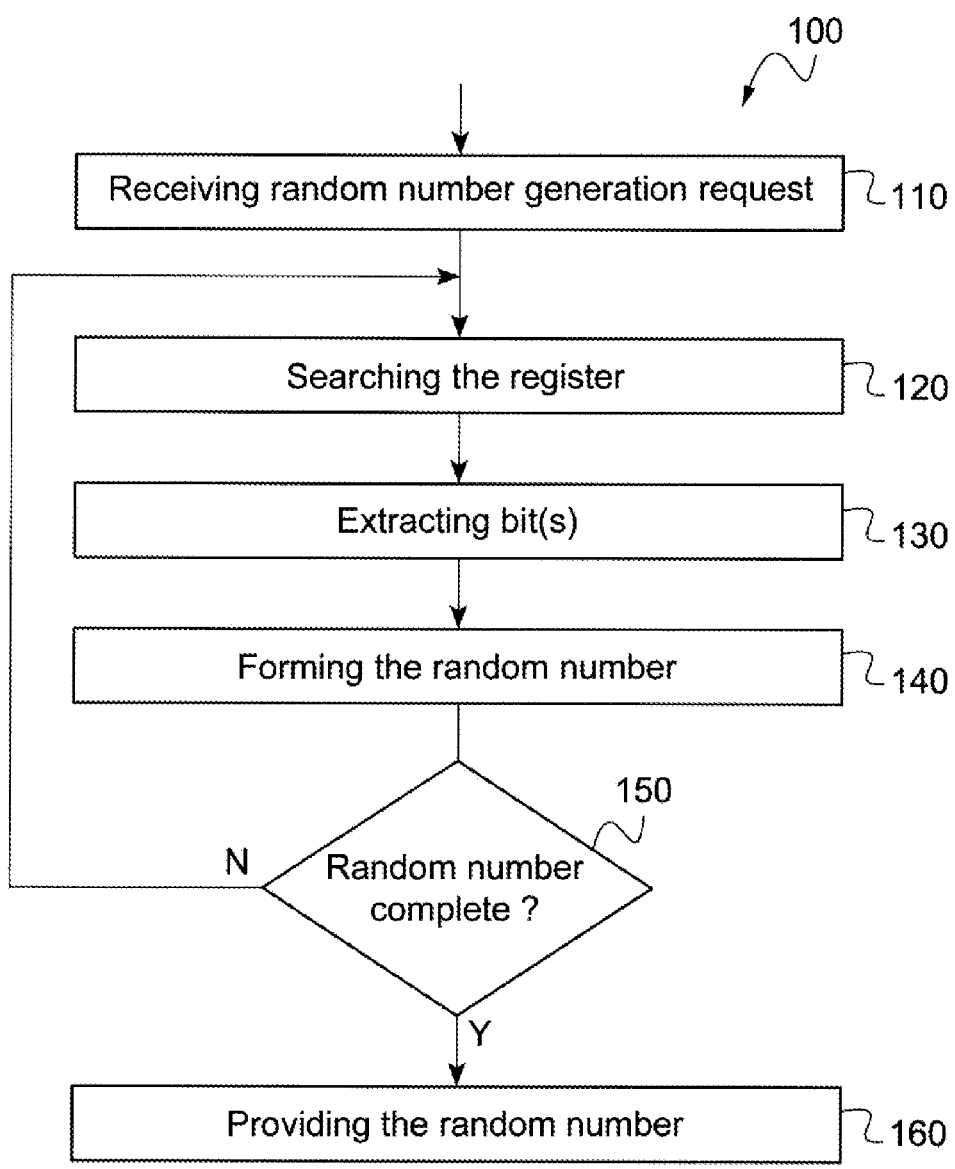
FIG. 3 is a block diagram showing the successive steps of implementation of the method of the invention.

FIG. 3 shows a block diagram 100 schematically illustrating the successive steps of the method for obtaining the random number 34 following the receipt (block 110) of a random number generation request:
a) searching the timestamp register 30 (block 120);
b) extracting the n bit(s) from the register (block 130);
c) using this or these bits to form the random number (block 140);
d) if the random number is not complete (test 150), reiterating steps 120 to 130; and finally
e) providing the random number (block 160) as a response to the request received at step 110.

It should be noted that the just-described method has several particularly significant advantages:
no addition of hardware element to the preexisting circuits of the digital processor, because no interaction with the outside (to use a physical phenomenon) or with the user is necessary;
simple and versatile implementation, the timestamp register existing on all the digital processors;

very high degree of entropy; and possibility to obtain very long random numbers in a very short time.

In practice, the generation method can be implemented at several levels:

entirely and directly within the processor firmware;

from this firmware to feed a higher level application software layer, thus from the processor to the application layer (which avoids the difficulties due to the microprocessor access protections because, in this case, that is the latter that generates internally and provides the random number); or conversely, from the application layer to the processor, upon request from the application. Since a high-level application (User Mode) generally has no privilege to access directly the processor registers, the implementation can be made at two levels with i) a module running at a high privilege level to access the processor registers and ii) a second module communicating with the first one and interfaced with the high-level program through a suitable API.

Characteristic of the invention, the random number generation method described above further provides at each iteration, in order to maximize the overall entropy of the process, a random or pseudo-random selection of the position of the n bits that will be extracted from the internal register(s) (instead of systematically choosing the least significant bits, as in the above example).

In a variant, the number n and/or the order of the bits extracted from the searched register is modified, also randomly or pseudo-randomly, at each search step. In other words, the value n is in this case itself random instead of being predefined, just as the order in which the n bits (if more than one bit) are used to form the random number.

In another variant, instead of simply copying the n bits extracted to form the N bits of the random number, in using these n bits by changing them, for example by reversing or swapping them according to a random or pseudo-random process, by summing all of them or some of them, etc.

Also characteristic of the invention, the random number generation method described above provides, as an alternative or as a variant, to use several of the internal registers of the processor for extracting bits therefrom, with a process for selecting the register to be used which is itself dependent upon a random or pseudo-random process, that is to say the register from which the n bits are extracted may change from one iteration to the other, in a non-deterministic manner.

Figure 4:
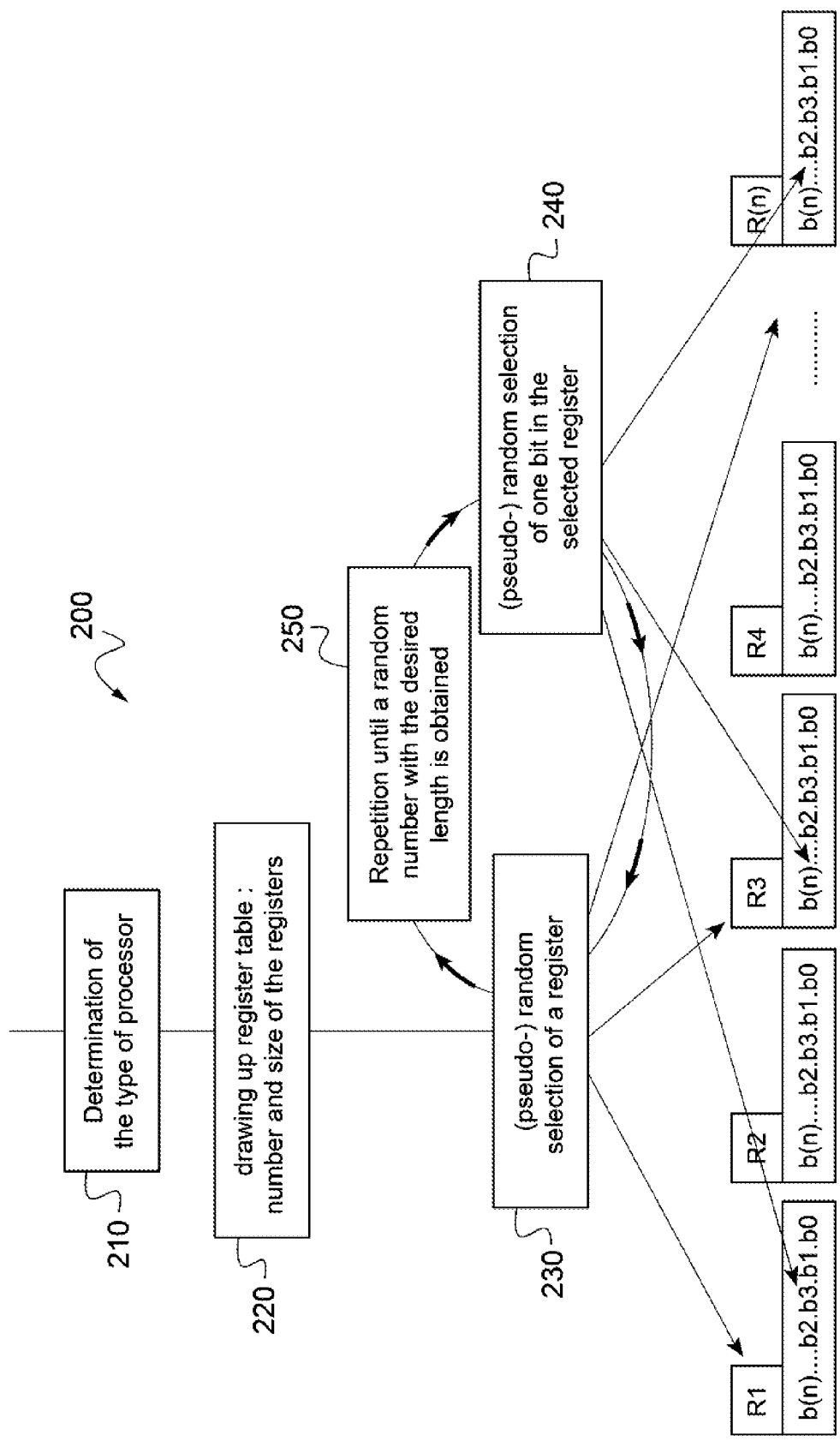
FIG. 4 is a diagram showing an improved embodiment of the invention, which combines several random selection techniques for obtaining the value to be generated.

FIG. 4 is a diagram 200 showing a general and improved embodiment of the invention, which combines several random selection techniques for obtaining the value to be generated.

The first step (block 210) is to determine the type of processor used with which it is desired to generate random numbers. Once this processor is identified, a table is completed with the registers that may be used for implementing the method (block 220), including the number of registers that may me used for this purpose, and for each register its address and its length. These registers are show as R1, R2, R3, . . . R(n) in FIG. 4, each of them being formed by a series of bits b0, b1, b2, . . . b(n).

The generation process may henceforth start, firstly with a first random or pseudo-random selection of one of the registers entered in the table (block 230), then a second, also random or pseudo-random, selection of one of the bits of the selected register (block 240)—or of several bits of this register, with the different variants described above.

These steps 230 and 240 are repeated (block 250) until completion of the random number to be generated (block 250), which number is eventually outputted to the requesting application.

A variant, which may be possibly combined with the techniques above, resides in the use of several of the internal registers of the processor in order to extract several bits therefrom, and to apply a combinatory process, e.g. a XOR, among the bits extracted from the different registers that have been searched.

The invention claimed is:

1. A random number generation method implemented by means of a digital processor of a computer, comprising:

responding to a function call processed by the digital processor in memory of the computer to produce a random number to an application circuit or software in the computer by processing computer program instructions by the processor within the computer, the instructions upon processing by the processor performing:

a) searching an internal register of the processor, wherein content of the internal register is evolutive changing over time;

b) extracting at a given time n bits from the register, n≥1;

c) using the n bits extracted at step b) as bit(s) for forming a random number of N bits to be generated;

d) repeating steps a) to c) until obtaining the N bits of the random number;

e) providing the random number to the application circuit or software; and, f) before step b), selecting, by a random of pseudo-random process, the n bits of the register which will be extracted at step b), and/or of selecting, by a random of pseudo-random process, one register among a plurality of internal registers of the processor that may be potentially searched and selecting the n bits from the selected register, in particular selecting, by a random of pseudo-random process, at least one of the bits of the selected register.

2. The method of claim 1, wherein at least one internal register of the processor comprises an internal timestamp register which counts pulses of a clock for sequencing the processor.

3. The method of claim 2, wherein the internal timestamp register is a register which counts pulses directly outputted from an oscillator of the clock.

4. The method of claim 1, wherein at least one internal register of the processor comprises a register which counts processor events.

5. The method of claim 1, wherein steps a) to e) are carried out within firmware of the processor.

6. The method of claim 1, wherein the n bits extracted at step b) are the least significant bit(s) of the register.

7. The method of claim 1, wherein the given time of extraction of the n bits at step b) is a time which is determined by a random or pseudo-random process.

8. The method of claim 1, wherein the given time of extraction of the n bits at step b) is a time determined in response to a request received from the application circuit or software.

* * * * *